US005488441A

United States Patent [19]

Pomatti

[11] Patent Number: 5,488,441
[45] Date of Patent: Jan. 30, 1996

[54] ADJUSTABLE EYEGLASSES RETAINER

[76] Inventor: Thomas W. Pomatti, 1127 15th St., Santa Monica, Calif. 90403

[21] Appl. No.: 124,769

[22] Filed: Sep. 20, 1993

Related U.S. Application Data

[63] Continuation-in-part of Ser. No. 839,364, Feb. 21, 1992, abandoned.

[51] Int. Cl.$^6$ .................................................. G02C 3/00
[52] U.S. Cl. ................................. 351/156; 351/43; 2/452
[58] Field of Search .................................. 351/156, 157, 351/123, 49, 43, 44; 24/3 C; 2/452, 451, 450, 449

[56] References Cited

U.S. PATENT DOCUMENTS 2,412,076  12/1946  Bouchard ..................................... 2/449
3,944,345   3/1976  Decorato ..................................... 351/43
4,549,793  11/1985  Yoon .......................................... 351/123
4,657,364   4/1987  Murrell ....................................... 351/156
4,974,956  12/1990  Gill ............................................ 351/156

Primary Examiner—William L. Sikes
Assistant Examiner—Hung Xuan Dang
Attorney, Agent, or Firm—John E. Halamka

[57] ABSTRACT

An eye-glass frame arrangement fabricated of a combination of a semi-rigid lens retaining support and a semi-flexible nose bridge and semi-flexible temple bows having a retaining strap removably engagable around the back of the head and adapted for use while engaging in activities which involve physical endeavor or usages on or around bodies of water. Closed cell shaped padding is applied to the lens supports facing the eye sockets. The arrangement is formed to have memory so that the lens supports are initially positioned away from the eye sockets and upon tightening of the retaining strap, the arrangement deforms to the shape of goggles so that the lens support padding seals around the eye sockets to protect the eyes of the user from the elements. In another arrangement, the eye pad is integrated with the lens support and hingedly attached to the temple bows.

18 Claims, 2 Drawing Sheets

ADJUSTABLE EYEGLASSES RETAINER

This application is a continuation in part of application Ser. No. 07/839,364 filed Feb. 21, 1992 which is hereby abandoned upon the filing of this application.

BACKGROUND OF THE INVENTION

1. Field of the Invention

This invention teaches the construction and use of a combination of a semi-rigid lens support and a semi-flexible nose bridge and temple bows frame arrangement for eyeglasses having a retaining strap and adapted for use while engaging in activities which involve physical endeavor such as sports, exercise, skiing or usages on or around bodies of water.

2. Description of the Prior Art

Prior solutions have attempted to keep standard, rigid, eye-glass frames attached to the user by means of a leash/retainer arrangement.

Some, such as U.S. Pat. No. 5,151,778 ('778), attach to the bows and secure the glasses to the user with a head band. However, this solution does not provide for ease of installation of the arrangement on or removal from the user nor does it provide for any adjustment to compensate for the size of the user's head.

Another solution taught by published international application PCT/US86/01832, also attaches a head band to the bows of ridged frames and provides elastic straps fitted with hook and loop fastening material which may be engaged and adjusted for a comfortable, snug fit after the glass frames are in place. However, the strap may not be pulled too tight as the ridged frame may break at the nose bridge or the pressure on the nose pads may become painful to the user.

Yet another solution shown in U.S. Pat. No. 2,499,140 teaches a ridged frame leash arrangement which pins to the clothing of the user. Should the glasses become dislodged during any activity, the leash keeps the glasses attached to the user. If the user is engaged in an activity which requires the use of both hands, the user may not be able to retrieve the glasses and reinstall them to protect the user's eyes from the sun or water.

'778 and others teach making the head band/leash from floatable material so that if dislodged during activity involving water, the arrangement may be retrieved from near the surface of the water. If the user is engaged in active mobile sports such as jet skiing, the exact point of loss of the arrangement may be difficult to determine necessitating the stopping of sports activity and the engagement of a search. All without the protection of the glasses. Should the user require prescription lenses, the search is rendered all that more difficult.

Devices taught by U.S. Pat. Nos. 3,944,345, 2,844,944 and others use a ridged frame shaped to conform to the contour of the user's eyes and fitted with a lens. The devices may incorporate a gasket between the frame arrangement and the user's face to achieve a watertight seal for swimmers goggles. While engaged in water activity, the goggles are functional. However, upon emerging from the water, continued wearing of goggles becomes uncomfortable and most users prefer to remove them. Once removed the user losses any protection from the elements, especially sun and wind. Once removed, the user must keep track of the glasses.

Others have attempted to solve the problems by creating special use goggles with large spherical lenses held in ridged frames formed to the contour of the user's eyes. An elastic strap around the back of the head holds the goggles in place. These goggles function well in such places as the basketball court but may make the user look out of place in other locations such as the beach or social activities off the court.

Thus there has long been a need for an arrangement which may utilize a flexible frame and a strap. The simple tightening of a strap pulls the lens and flexible frame from the normal, accepted glasses position resting away from the eye to a goggle position secured and sealing the eyes while firmly attached to the user.

It is desired that the arrangement assume the common shape of glasses during activity such as going to the sports activity forum. The lenses installed in the frames may be chosen by the user from the vast array known in the art.

Upon reaching the sports activity forum the user may adjust the retaining strap to achieve a comfortable, even watertight fit of the frames so that they stay attached during activities such as surfing, water jet skiing, snow skiing, etc.

SUMMARY OF THE INVENTION

Accordingly, it is an object of the present invention to provide an improved eye-glass retaining arrangement which when initially put on by the user has the configuration of ordinary eye-glasses.

It is another object to allow the user to select and have installed in the frame any lens available in the art for whatever degree of protection and/or sight correction.

It is yet another object to allow the user to tighten the eye-glass frame so that its shape changes from the normal configuration to that of goggles thereby retaining the arrangement on the user during even the most strenuous physical activity.

The above and other objects of the present invention are achieved, according to a preferred embodiment thereof, by providing a semi-rigid lens retaining frame combined with semi-flexible nose bridge and temple bows.

An adjustable retaining strap is attached to the ends of the temple bows to hold the eye-glasses in place.

In the preferred embodiment, the user may tighten the retaining strap which results in the application of sufficient force to deform the semi-flexible portions of the frame so that the frame will conform to the shape of the user's head. Waterproof padding may be mounted on the semi-rigid lens frame so that the deformed eye-glasses operate as water resistant goggles.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
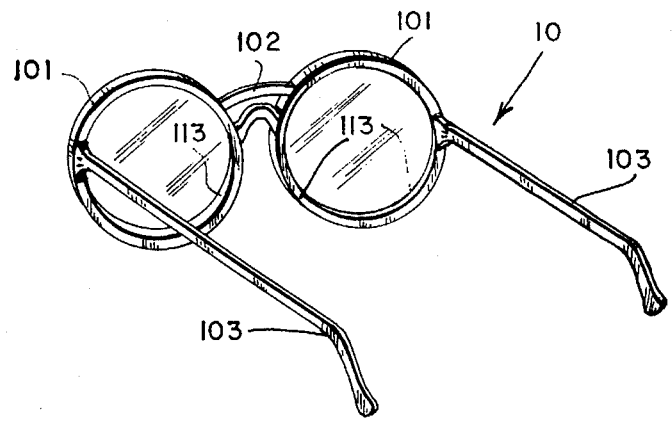
FIG. 1 represents a perspective view of the eye-glass frame arrangement.

Referring now to the drawing, there is illustrated in FIG. 1 a perspective view of the eye-glass frame arrangement 10. The frame 10 is fabricated of material which is strong yet very flexible. The lens support 101 portions of the frame 10 are fabricated of material which is more rigid than the nose bridge 102 and temple bow 103 portions.

The lens support 101 is fabricated with a channel 113 formed on the inside periphery and adapted to hold a user selected lens after the lens is popped into the channel 113. Note that the user selected lens must substantially conform to the shape of the lens support 101.

In the preferred embodiment, the lens supports 101, nose bridge 102 and temple bows 103 are formed as a single piece with memory of the normal shape of eye-glass frames having the lens positioned away from the eye sockets. This one piece fabrication eliminating the need to attach hinges between the temple bows 103 and the lens supports 101.

A retaining strap 104 is mounted to the ends of the temple bows 103.

Figure 3:
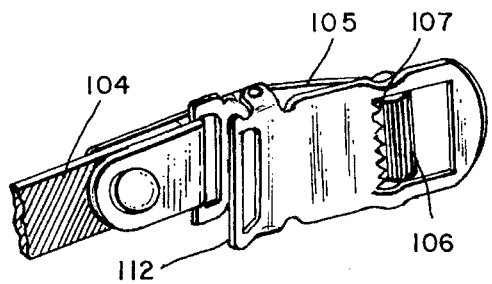
FIG. 3 represents a perspective view of the fastener.
Figure 4:
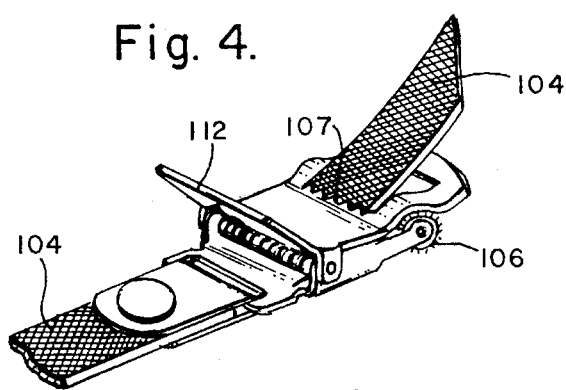
FIG. 4 represents a perspective view of the engaged fastener.

In the preferred embodiment, the retaining strap 104 is fabricated of two preselected lengths of waterproof webbing material. One end of each length is mountable to the end of one of the bows 103. Fastening means such as an alligator spring grip buckle 105 is mounted on one free end of the retaining strap 104 as represented in FIG. 3. The remaining free end of the retaining strap 104 is engaged between the roller 106 and the teeth 107 of the buckle 105 as represented in FIG. 4. In the preferred embodiment, the fastening means is fabricated of material which will resist corrosion when exposed to water.

Waterproof material such as closed cell neoprene foam lens pad 108 is mounted on the inside of the lens supports 101. The shape and the thickness of the lens pads 108 are selected to form a seal around the eyes as discussed below.

After placing the frame arrangement 10 on the head, the user may simply leave the ends of the retaining strap 104 fall to the back. Or the user may engage the free end of the strap 104 into the fastening means, pull on the free end of the retaining strap 104 until the fit of the frame 10 is comfortable without distorting the normal shape of the frame 10 resting away from the eyes.

Further pulling on the free end of the retaining strap 104 will deform the more flexible portions of the frame 10 until the frame 10 conforms to the users head as goggles with the lens supports 101 and lenses near the eyes and the lens pads 108 engaging the eye sockets and sealing the eyes from wind and water.

The frame 10 may be returned by the user from the goggle position to the normal position by depressing the release tab 112 of the fastening means.

Additional neoprene foam may be mounted on the ends of the temple bows 103 to form ear pads 109 for the comfort of the user. The material for the ear pads 109 may be closed cell to add to the floatability of the arrangement 10.

Because some activity may result in the stripping of the frame arrangement 10 from the user, the arrangement 10 may include a leash 110 having one end mounted to a preselected portion such as an ear pad 109 with the other end engagable with the user's clothing by clip means 111 mounted on the other end of the leash 110. Should the arrangement 10 become dislodged from the face of the user, especially in the normal glasses mode, it will not be lost.

Fastening means such as the alligator spring grip buckle 105 may tend to engage the hair of the user during installation or tightening of the retraining strap 104. A hair pad 114 may be mounted on the retaining strap in a position behind the buckle 105 to separate the user's hair from the moving parts of the buckle 105 and dissipate the pressure of the buckle 105 on the head of the user. The hair pad 114 may be made of closed cell neoprene so that it performs the function of a cushion and also adds to the floatability of the arrangement 10 should the arrangement 10 be knocked into the water.

Figure 5:
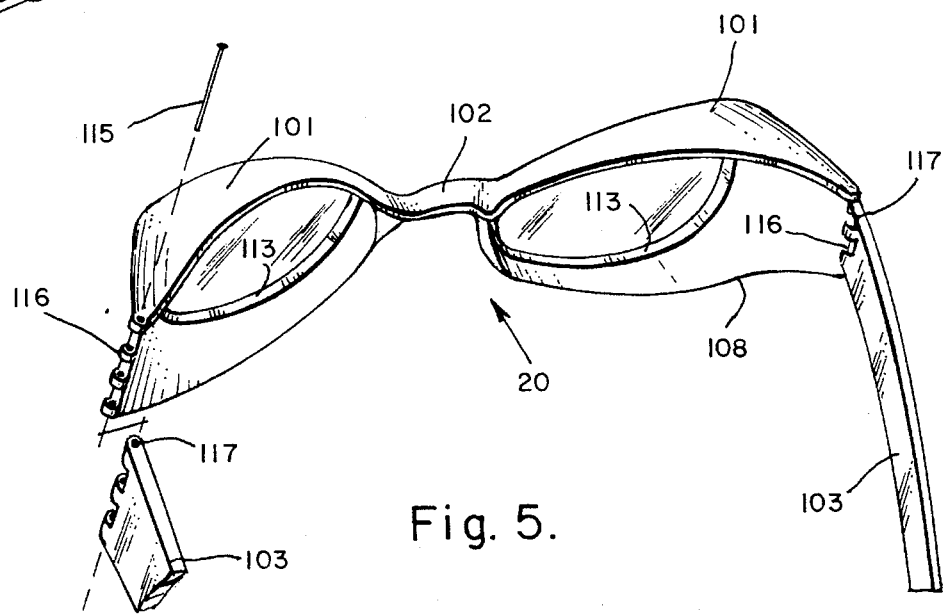
FIG. 5 represents a perspective view of another embodiment of the arrangement.
Figure 2:
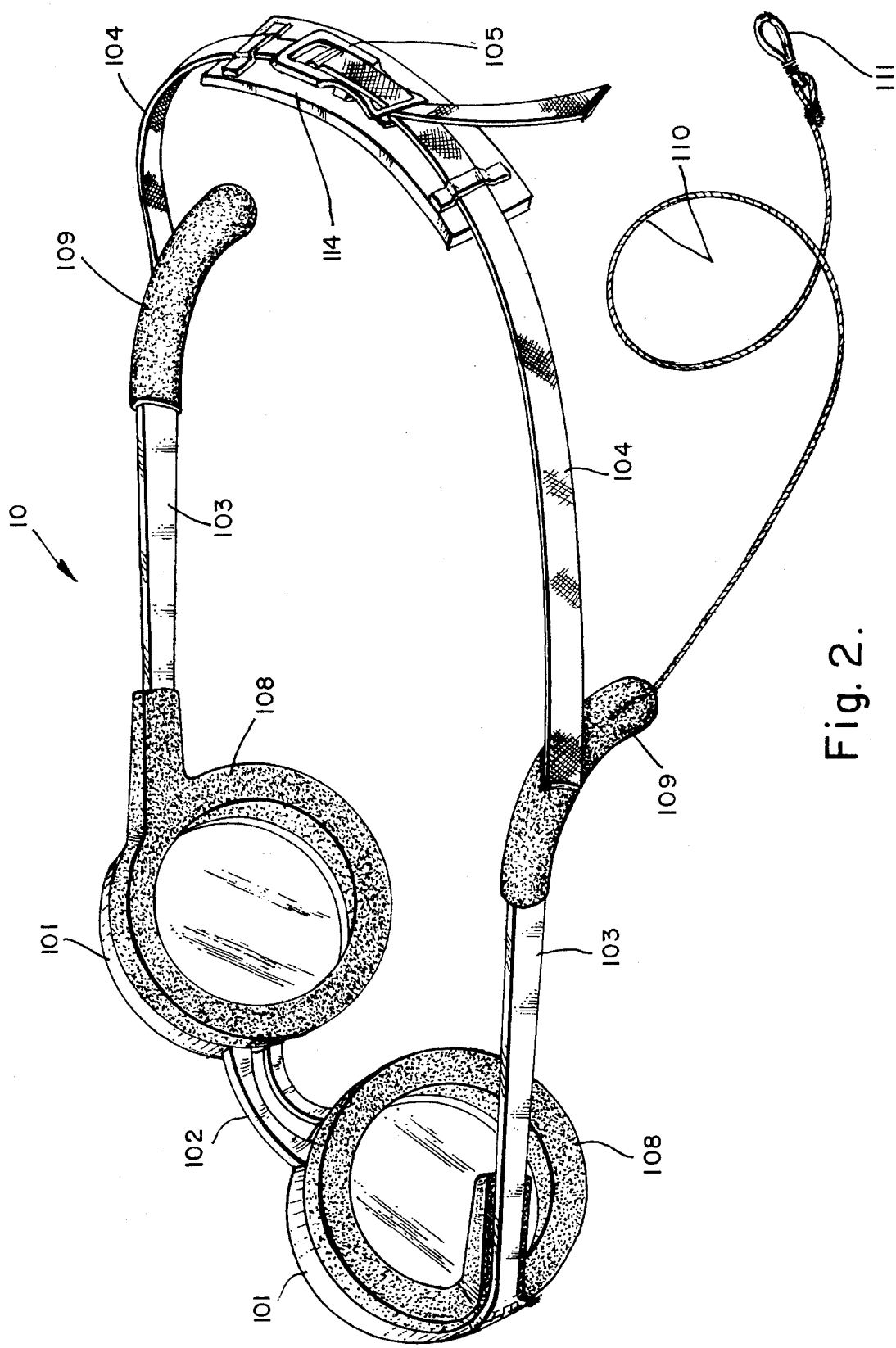
FIG. 2 represents a perspective view of a preferred embodiment of the arrangement.

There is illustrated in FIG. 5 another embodiment of the arrangement, generally designated 20. In this arrangement, the lens supports 101, nose bridge 102 and lens pad 108 are integrated as one unit and fabricated of semi-flexible material. A channel 113 is formed on the inside of the lens support 101 to retain a lens.

A hinge brace 116 is formed along the outer edge of the lens pad 108, one on the left hand side and one on the right hand side.

The temple bows 103 are formed with a hinge support 117 engagable with the right or the left hinge brace 116. A hinge pin 115 may be used to insert through the hinge brace 116 and hinge support 117 to retain the temple bow 103 attached to the lens pad 108.

The above described retaining strap 104, fastening means, ear pads 109 and leash 110 may be attached to the arrangement 20. The hair pad 114 may also be incorporated with this arrangement 20.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. An eye-glass frame arrangement for holding a lens in front of each eye of the user comprising, in combination;

a plurality of lens supports fabricated of semi-rigid material, the shape of the internal periphery surface of said support being adapted to hold one of said lens upon the condition of said lens being popped into said support;

a nose bridge fabricated of semi-flexible material and mounted to said lens supports so that one lens is in front of each eye of the user under the condition of the nose bridge being mounted on the nose of the user;

a plurality of temple bows fabricated of semi-flexible material and mounted on said lens supports in a position engagable with the users ears;

eye pads fabricated of closed cell foam and mounted to said lens supports in a position facing the eye sockets of the user; and, a retaining strap arrangement mountable to the ends of the temple bows remote from the lens supports and having an adjustable fastener means whereby the user may tighten said retaining strap to deform the frame arrangement from a normal position away from the eye sockets to a goggle position with said eye pads engaged with the users eye sockets.

2. The eye-glass frame arrangement in claim 1 wherein:

said retaining strap is fabricated of waterproof webbing material.

3. The eye-glass frame arrangement in claim 1 wherein: said lens supports, said nose bridge and said temple bows have a memory of glass frames in which the lens supports are positioned away from the eye sockets of the user.

4. The eye-glass frame arrangement in claim 1 further comprising:

a leash with one end mounted to said retaining strap arrangement; and, a clip means mounted on the free end of said leash whereby the user may engage said clip to a selected portion of clothing thereby preventing loss of said frame arrangement upon the condition of said frame arrangement being disengaged from the head of the user.

5. The eye-glass frame arrangement in claim 1 further comprising:

an ear pad mounted on each of the ends of the temple bows.

6. The eye-glass frame arrangement in claim 5 wherein: said ear pad is fabricated of closed cell foam pad.

7. The eye-glass frame arrangement in claim 1 wherein: said adjustable fastener means further comprises a release tab.

8. The eye-glass frame arrangement in claim 1 further comprising:

a hair pad mounted on said retaining strap in a position between said fastening means and the head of the user.

9. The eye-glass frame arrangement in claim 8 wherein: said hair pad is fabricated of closed cell foam pad.

10. An eye-glass frame arrangement for holding a lens in front of each eye of the user comprising, in combination;

a plurality of lens supports fabricated of semi-rigid material, the shape of the internal periphery surface of said support being adapted to hold one of said lens upon the condition of said lens being popped into said support;

a nose bridge fabricated of semi-flexible material and mounted to said lens supports so that one lens is in front of each eye of the user under the condition of the nose bridge being mounted on the nose of the user;

eye pads fabricated of semi-flexible material and extending from each of said lens supports in a position facing the eye sockets of the user;

hinge braces formed at the outer edges of said eye pads;

a plurality of temple bows fabricated of semi-flexible material and terminating in a hinge support engagable with at least one said hinge brace;

a plurality of hinge pins insertable through at least one said hinge brace and one said hinge support thereby hingedly attaching each said temple bow to said eye pad in a position engagable with the users ears;

a retaining strap arrangement mountable to the ends of the temple bows remote from the lens supports and having an adjustable fastener means whereby the user may tighten said retaining strap to deform the frame arrangement from a normal position away from the eye sockets to a goggle position with said eye pads engaged with the users eye sockets.

11. The eye-glass frame arrangement in claim 10 wherein:

said retaining strap is fabricated of waterproof webbing material.

12. The eye-glass frame arrangement in claim 10 wherein:

said lens supports, said nose bridge and said eye pad when attached to said temple bows have a memory of glass frames where in the lens supports are positioned away from the eye sockets of the user.

13. The eye-glass frame arrangement in claim 10 further comprising:

a leash with one end mounted to said arrangement; and, a clip means mounted on the free end of said leash whereby the user may engage said clip to a selected portion of clothing thereby preventing loss of said arrangement upon the condition of said arrangement being disengaged from the head of the user.

14. The eye-glass frame arrangement in claim 10 further comprising:

an ear pad mounted on each of the ends of the temple bows.

15. The eye-glass frame arrangement in claim 14 wherein: said ear pad is fabricated of closed cell foam pad.

16. The eye-glass frame arrangement in claim 10 wherein: said adjustable fastener means further comprises a release tab.

17. The eye-glass frame arrangement in claim 10 further comprising:

a hair pad mounted on said retaining strap in a position between said fastening means and the head of the user.

18. The eye-glass frame arrangement in claim 17 wherein: said hair pad is fabricated of closed cell foam pad.

* * * * *